Figure 1:
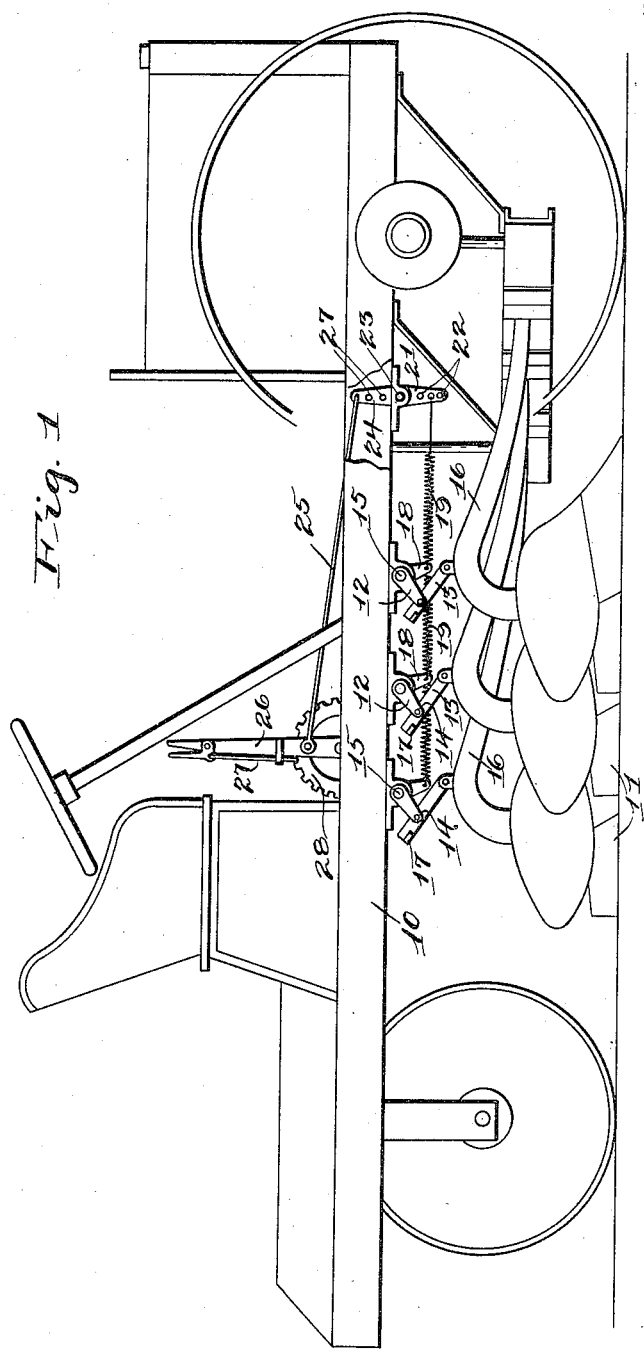

L. S. HACKNEY.
PLOW ADJUSTING DEVICE FOR GANG PLOWS.
APPLICATION FILED MAY 31, 1912.

1,064,967.

Patented June 17, 1913.

Witnesses
F. C. Caswell
J. M. Hardy

Inventor
Leslie S. Hackney
by John E. Stryker Atty.

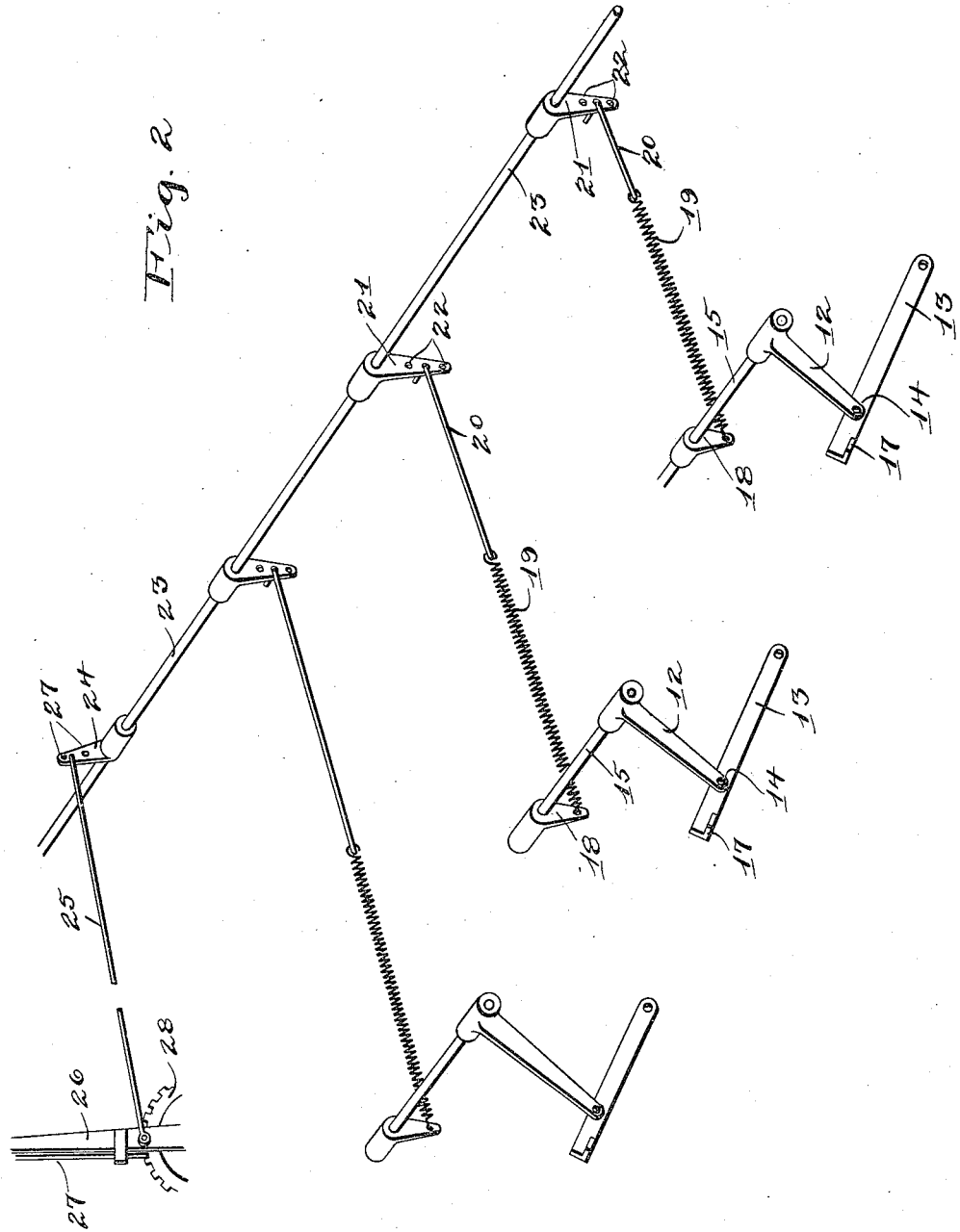

UNITED STATES PATENT OFFICE.

LESLIE S. HACKNEY, OF ST. PAUL, MINNESOTA.

PLOW-ADJUSTING DEVICE FOR GANG-PLOWS.

1,064,967.  Specification of Letters Patent.  Patented June 17, 1913.

Original application filed August 14, 1911, Serial No. 643,922. Divided and this application filed May 31, 1912. Serial No. 700,657.

*To all whom it may concern:*

Be it known that I, LESLIE S. HACKNEY, a citizen of the United States, residing at St. Paul, in the county of Ramsey and State of Minnesota, have invented new and useful Improvements in Plow-Adjusting Devices for Gang-Plows, of which the following is a specification.

My invention relates to improvements in plow adjusting devices for gang plows. Its object is to provide simple and durable means for yieldingly holding each plow of a gang in its operative position, said means being quickly and easily adjustable so that greater or less pressure may be brought to bear on either or all of the plows in the gang.

This application is a division of an application for patent on motor plows, Serial No. 643,922, filed by me on August 14, 1911.

In the drawings, Figure 1 is a side elevation of a traction vehicle, with my improved plow adjusting mechanism attached, and Fig. 2 is a detail perspective view of the same.

Referring to said drawings, I have used the reference numeral 10 to indicate the frame of a traction vehicle, and 11 to indicate the plows attached thereto. Identical supports are provided for yieldingly holding each of the plows in its operative position. Each support comprises an upper link 12 and a lower link 13. These links are pivotally connected at 14 and one end of the link 12 is carried by the stub shaft 15, revoluble on the frame 10, while the opposite end of the link 13 is pivotally connected to a plow beam 16. The links 12 and 13 fold toward each other when the plows are elevated and extend when the plows are lowered. A stop 17 is provided on the lower link 13 to engage the upper link 12 and prevent the extreme extension of said links and the consequent alinement of their centers. The stub shaft 15 is provided with an arm 18 which is connected by a spring 19 and rod 20 to a second arm 21 on the forward end of the frame. The arm 21 is formed with a series of apertures 22, each aperture being adapted to receive the end of the rod 20. The spring 19 tends to extend the support. Any upward movement of the plows due to inequalities of the ground or caused by plow lifting mechanism is accomplished against the action of said spring.

The tension of all the springs 19 is adjusted simultaneously by the rotation of the shaft 23 on which the arms 21 are mounted. This shaft is furnished with an upright arm 24, connected by the rod 25 to the hand lever 26. Said lever is provided with a pawl 27 and notched sector 28 and may be moved to rotate the shaft 23 and lock the same in any desired position. The arm 24 is formed with a series of apertures 27 and the relative movement between the lever 26 and the shaft 23 may be varied by attaching the rod 25 in different apertures 27 of said arm 24. The tension of the springs 19 may also be severally adjusted by attaching the rods 20 in different apertures of their respective arms.

In operation, the springs 19 act to extend the supports and yieldingly hold the plows in their operative positions. The tension of these springs may be adjusted simultaneously by shifting the lever 26 and independent adjustment of the several springs may be secured by attaching a rod 20 in different apertures of its respective arm 21.

Having described my invention, what I claim as new and desire to protect by Letters Patent, is:

1. In a device of the class described, the combination of a frame, plow beams attached to said frame, plow bodies on said beams, folding supports between the frame and each plow beam, springs for operating said supports to yieldingly hold the plows in their operative positions and means for regulating the tension of said springs severally and collectively.

2. In a device of the class described, the combination of a frame, plow beams attached to said frame, plow bodies on said beams, folding supports between the frame and each plow beam, each support comprising an upper and lower link and a spring between one of said links and said frame for extending the support to yieldingly hold the plows in their operative positions and means for simultaneously adjusting the tension of said springs.

3. In a device of the class described, the combination of a frame, plow beams attached to said frame, a shaft revoluble on said frame, arms on said shaft, means for rotating the shaft and locking the same in different positions, a support between the frame and each plow beam, said support comprising an upper link, a shaft revoluble on the frame and forming a mounting for said upper link, a lower link pivotally attached at one end to a plow beam and pivotally connected to the free end of said upper link, an arm on said shaft, and a spring attached at one end to said arm and its other end to one of said first mentioned arms.

4. In a device of the class described, the combination of a frame, plow beams attached to the frame and furnished with plow bodies, a shaft revoluble on the frame, perforated arms on said shaft, means for rotating the shaft and locking the same in different positions, a support between the frame and each plow beam for yieldingly holding the plows in operative position, each of said supports comprising an upper link, a shaft revoluble on the frame and forming a mounting for said upper link, a lower link pivotally attached at one end to a plow beam and pivotally connected to the free end of said upper link, an arm on said shaft, a spring attached at one end to said arm, a rod connected at one end to said spring and attached at its other end in one of the perforations in one of said first mentioned arms.

5. In a device of the class described, the combination of a frame, plow beams pivotally attached to the frame and furnished with plow bodies, a shaft revoluble on the frame, arms on said shaft, a hand lever connected with one of said arms for rotating said shaft, a folding support between the frame and each plow beam, said support comprising an upper link, a shaft revoluble on the frame and forming a mounting for said upper link, a lower link pivotally attached at one end to a plow beam and pivotally connected to the free end of said upper link, an arm on said shaft, a spring attached at one end to said arm and at the other end to one of said first mentioned arms.

6. In a device of the class described, the combination of a frame, plow beams pivotally attached to the frame and supplied with plow bodies, a shaft revoluble on the frame, perforated arms on said shaft, a hand lever, a rod connected at one end to the hand lever and attached at its other in a perforation in one of said arms, means for locking said lever to prevent the rotation of said shaft, a folding support between the frame and each plow beam for yieldingly holding the plows in operative position, each support comprising an upper link, a shaft revoluble on the frame, a lower link pivotally attached at one end to a plow beam and pivotally connected to the free end of said upper link, an arm on said shaft and a spring attached at one end to said arm, and at the other end to one of said first mentioned arms.

In testimony whereof, I have signed my name to this specification in the presence of two subscribing witnesses.

LESLIE S. HACKNEY.

Witnesses:
ASHLEY COFFMAN,
J. KAVANAGH.

---

Copies of this patent may be obtained for five cents each, by addressing the "Commissioner of Patents, Washington, D. C."